(12) United States Patent
Bohannon

(10) Patent No.: US 6,343,826 B2
(45) Date of Patent: Feb. 5, 2002

(54) TRUCK BED EXTENDER

(76) Inventor: Jerry Bohannon, 8997 Home Ave., Irvington, AL (US) 36544

( * ) Notice: Subject to any disclaimer, the term of this patent is extended or adjusted under 35 U.S.C. 154(b) by 0 days.

(21) Appl. No.: 09/827,649

(22) Filed: Apr. 6, 2001

Related U.S. Application Data

(63) Continuation-in-part of application No. 09/469,442, filed on Dec. 21, 1999, now Pat. No. 6,213,530.
(60) Provisional application No. 60/114,869, filed on Jan. 6, 1999.

(51) Int. Cl.[7] .............................. B60P 7/08; B60P 7/135; B62D 33/023
(52) U.S. Cl. ................. 296/26.08; 296/26.01; 296/26.04; 296/50; 296/51
(58) Field of Search ............... 296/26.01, 26.02, 296/26.04, 26.08, 50, 51

(56) References Cited

U.S. PATENT DOCUMENTS

| | | | |
|---|---|---|---|
| 5,071,185 A | 12/1991 | Schiele | 296/3 |
| 5,120,102 A | 6/1992 | Cumbie | 296/3 |
| 5,197,642 A | 3/1993 | Cortelli | 224/310 |
| 5,741,078 A | 4/1998 | Sasaki | 384/43 |
| 5,743,583 A | 4/1998 | Lowe | 296/3 |
| 5,823,597 A | 10/1998 | Anderson | 296/26.08 |
| 6,213,530 B1 | 4/2001 | Bohannon | 296/26.08 |

*Primary Examiner*—Stephen T. Gordon
*Assistant Examiner*—Greg Blankenship

(57) ABSTRACT

An auxiliary load supporting apparatus for a vehicle having a front and a rear and a left and right sidewall, comprising: a first base mounted to said left sidewall and extending upward therefrom to a desired height, between six inches and 50 inches above said left sidewall; a second base mounted to said right sidewall and extending upward therefrom to a desired height, between six inches and 50 inches above said right sidewall; a first framework mounted to said first base and extending rearward therefrom away from the left sidewall; a second framework mounted to said second base and extending rearward therefrom away from the right sidewall; a transom extending from the first framework to the second framework rearward from the rear. A third support point is defined by the angle between the transom and the truck bed by the tailgate of the truck so that the transom does not need to take all of the support of the load.

16 Claims, 5 Drawing Sheets

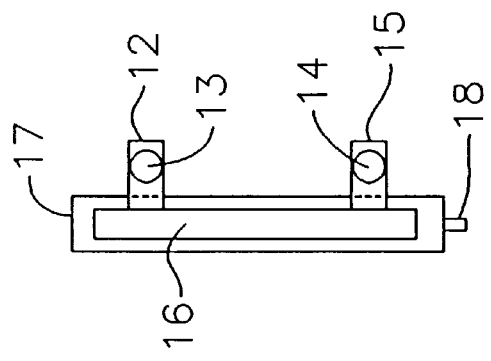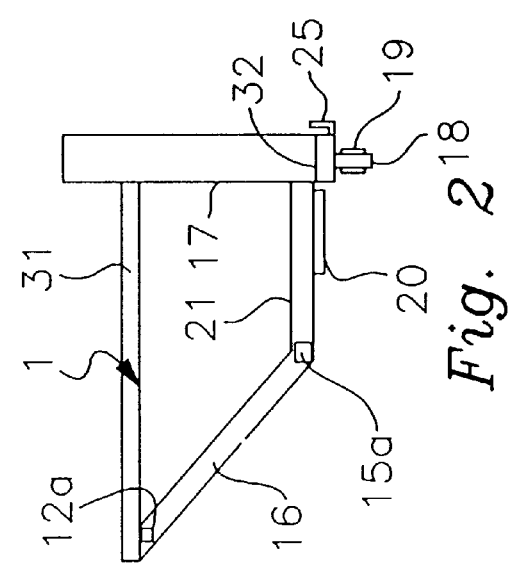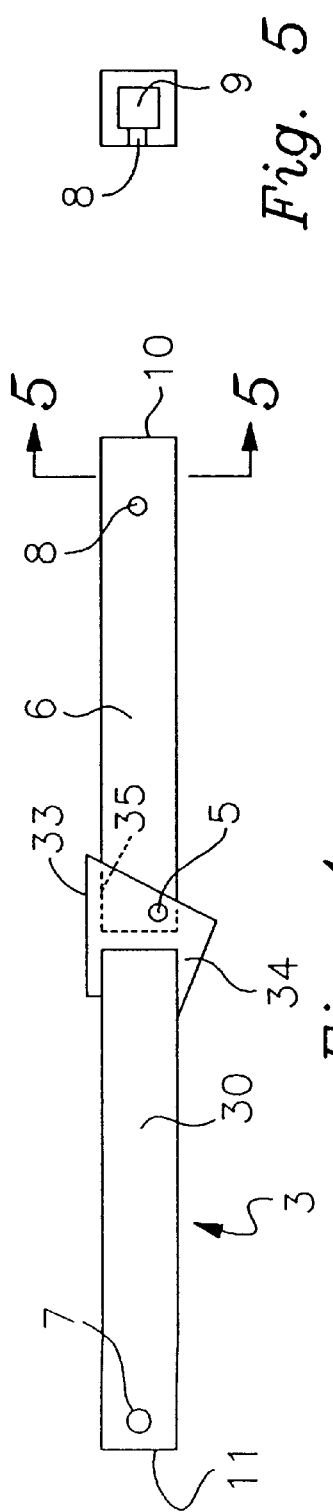

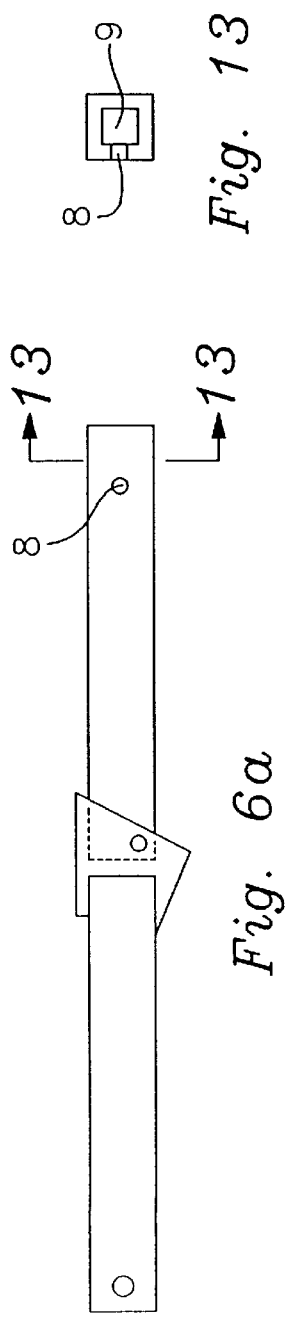
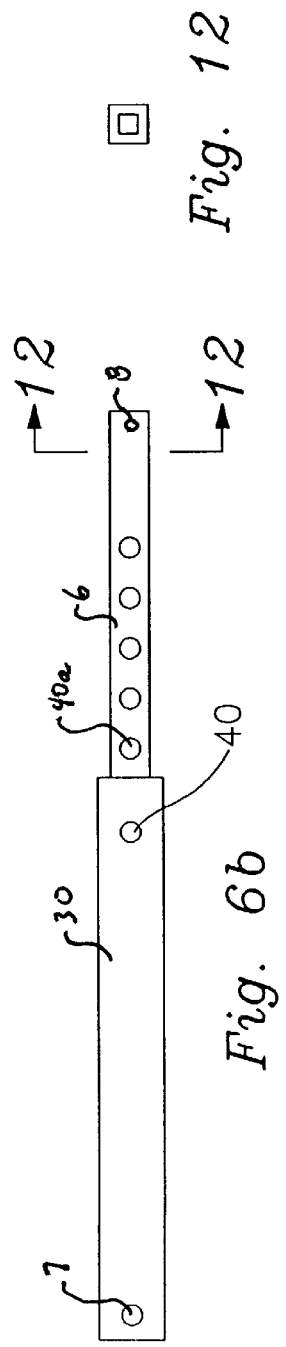
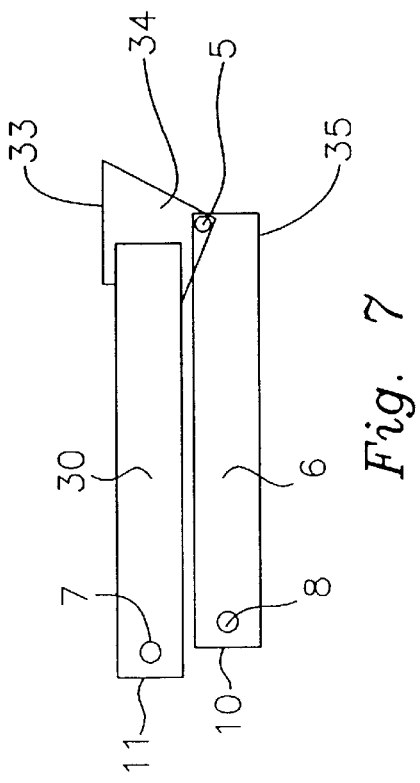

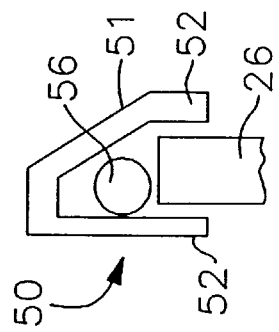
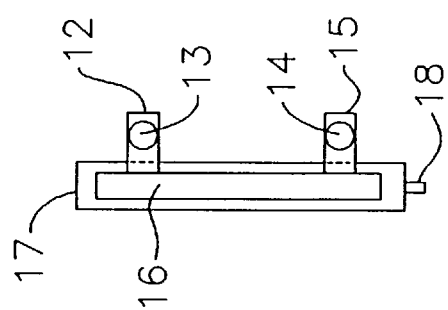
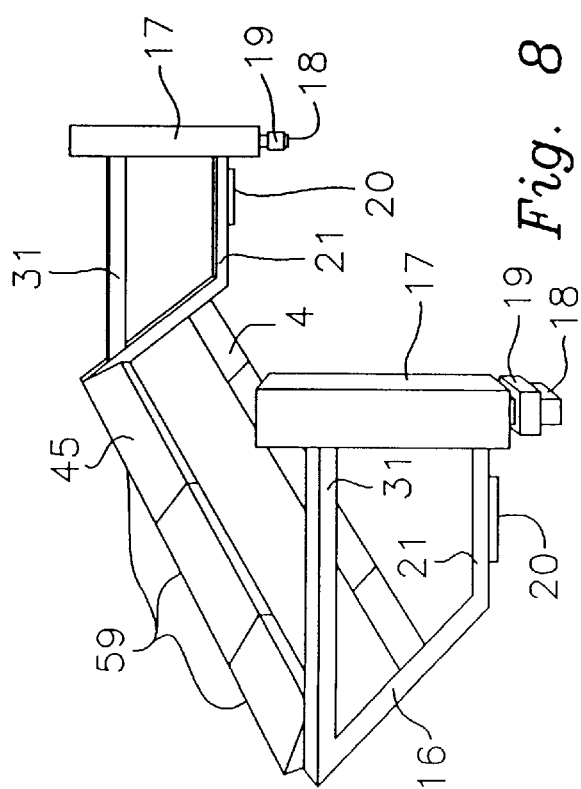
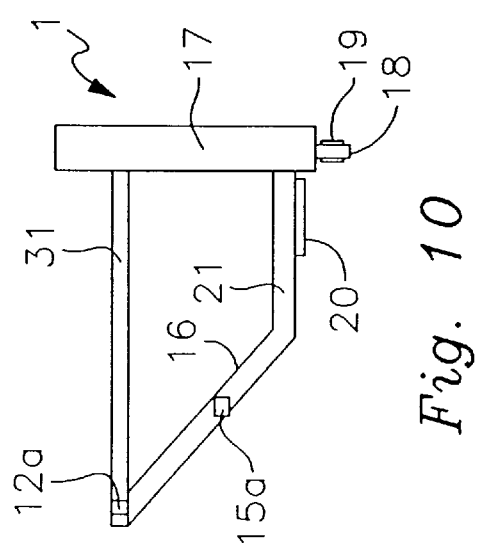

TRUCK BED EXTENDER

PRIORITY

This is a continuation in part of Provisional Patent No. 60/114,869 filed Jan. 6, 1999, and Ser. No. 09/469,442 filed Dec. 21, 1999 now U.S. Pat. No. 6,213,530.

BACKGROUND OF INVENTION

1. Field of Invention

The invention pertains to truck bed extending devices. More particularly the invention describes an extension attachable to the rear of a truck allowing the weight of an article carried to be borne by the extended transom and the top of the truck tailgate.

2. Prior Art

The Lowe U.S. Pat. No. 5,743,583 shows a rack system fitting above the truck and in front of the tailgate. Loads may be carried above the vehicle. The design suggests that the rack itself is to support the weight independently. While it folds, it does not easily assemble or break down to fit within a tool box nor does it fit within the "Stake Socket" of the truck.

The Cumbie U.S. Pat. No. 5,120,102 shows a load bearing extension requiring a trailer hitch. A hook assembly does not support the unit which uses the receiver hitch 42-44-48 for support but does prevent the unit from falling. The unit is designed to extend the bed, but does not utilize the top of the tailgate or a cushion thereon to provide added support.

The Lemajeur U.S. Pat. No. 5,662,259 shows a rack to support loads above a bed. It does not extend the length of the bed, but may extend the width. While it fits within specialized brackets 93 it has a complex assembly (FIG. 2) and does not use the top of the tailgate or "Stake Socket" of the truck. While it folds, the Johnson U.S. Pat. No. 5,678,743 functions similarly to Cumbie, although the height of the load is reduced. This construction is also not easily folded or cross-braced, and does not use the tailgate as a support.

The Barden U.S. Pat. No. 2,646,909 shows a bracket system beside and not utilizing the bed. Milstead U.S. Pat. No. 2,672,265 is similarly designed.

The Lund U.S. Pat. No. 2,678,150 uses the "Stake Socket" of the truck to support a rack similar to Barden and Milstead; but neither of these three (3) utilizes the bed but instead create an auxiliary rack system. They also fail to use the tailgate top for support.

The Hunt U.S. Pat. No. 2,680,544 shows another folding extension rack system as does Moore U.S. Pat. No. 5,255,951.

The Sexton U.S. Pat. No. 5,398,778 shows a wide, not lengthening, rack system which does not extend the length of the bed for purposes of carrying a load from the bed and beyond and teaches away from that concept.

The DeFreza U.S. Pat. No. 4,138,046 utilizes elongated vertical members fitting within tubular receiving openings in the truck as does the '989 Patent, FIG. 10. The DeFreza Patent also shows a raised rack system which does not provide a support beyond the vehicle bed and does not utilize the tailgate for support. It does collapse, but not in the same manner disclosed.

The Schmeets U.S. Pat. No. 5,775,655 shows a foldable table but fails to add to the art of the rack systems.

The Blondo U.S. Pat. No. 5,593,076 is merely an example of a bike rack which is prior art only in so far as it shows a folding rack system.

The Robertson U.S. Pat. No. 4,079,989 shows a cover which supports a rack above the bed, but necessarily avoids using the bed.

None of the prior art utilized the top of the tailgate as well as the extension or as well as an extended surface to provide a support.

GENERAL DISCUSSION OF THE INVENTION

This invention comprises a support for a member from the truck bed to the top of the tailgate of the truck bed.

Generally, the invention may be described as follows:

An auxiliary load supporting apparatus for a vehicle having a front and a rear and a left and right sidewall, comprising:

a first base mounted to said left sidewall and extending upward to a desired height, between six inches and 50 inches above said left sidewall;

a second base mounted to said right sidewall and extending upward therefrom to a desired height, between six inches and 50 inches above said right sidewall;

a first framework mounted to said first base and extending rearward away from the left sidewall;

a second framework mounted to said second base and extending rearward therefrom away from the right sidewall;

a transom extending from the first framework to the second framework rearward from the rear.

The rise from the top of the tail gate or an extension mounted on the top of the tailgate to the top of the transom is such that a plane from a predetermined stop position plate 43 along the truck bed to the transom would intersect the top of the tailgate or the top of an extension of the top of the tailgate.

Hence, there are several advantages not present in the prior art in the invention disclosed.

(1) It utilizes the vehicle bed to hold the load beyond the bed at an angle which allows the load to be partially supported against the top of the tailgate or a cushion on top of the tailgate but the tailgate may be lowered when the loads are reduced (as when parked).

(2) The cross-bracing is easily installed and replaced for different width vehicles.

(3) The device is solely supportable by the Stake Socket.

(4) The length of the bed is, extended without a support extension to the truck bed attached to a hitch.

(5) The device is easily disassembled and foldable within a toolbox.

These and other objects and advantages of the invention will become better understood hereinafter from a consideration of the specification with reference to the accompanying drawings forming part thereof, and in which like numerals correspond to parts throughout the several views of the invention.

BRIEF DESCRIPTION OF THE DRAWINGS

For a further understanding of the nature and objects of the present invention, reference should be made to the following detailed description taken in conjunction with the accompanying drawings in which like parts are given like reference numerals and wherein:

FIG. 2 shows a detail of the left support.

FIG. 3 shows a side view of the detail shown in FIG. 2.

FIG. 4 shows one version of the transom.

FIG. 5 shows a cross section from FIG. 4.

FIG. 6 shows an alternate of the transom shown in FIG. 4.

FIG. 7 shows a detail of the folded cross-bar.

FIG. 8 shows an assembled product.

FIG. 9 shows a detailed view of a cover for the top of the tailgate.

FIG. 10 shows a detailed view of a bracing arm.

FIG. 11 shows a cross section of the main support through the 11—11 axis.

FIG. 12 shows a cross section through the 12—12 axis of FIG. 6b.

FIG. 13 shows a cross section through the 13—13 axis of FIG. 6a.

DETAILED DESCRIPTION OF THE PREFERRED EXEMPLARY EMBODIMENTS

Figure 1:
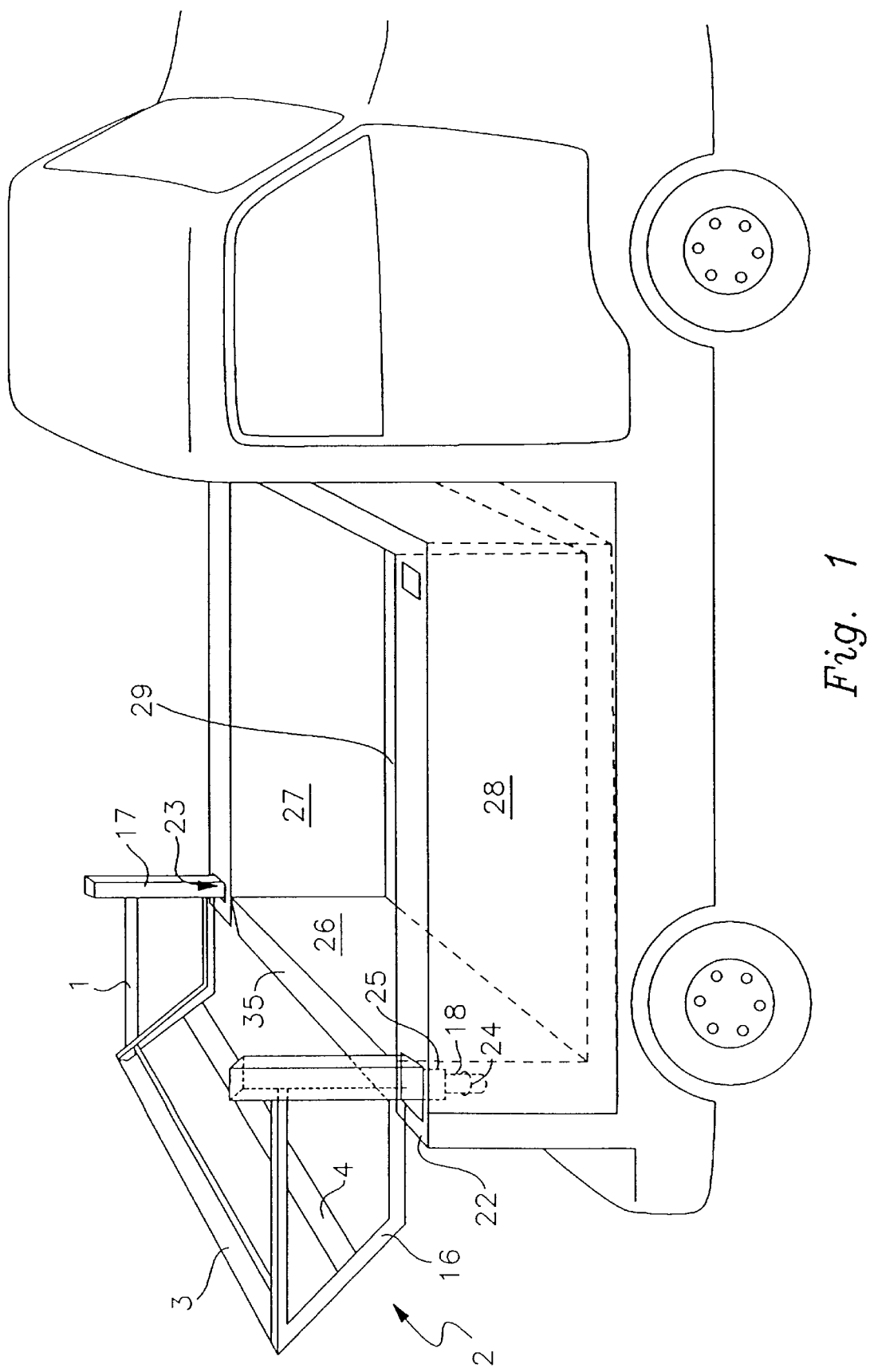
FIG. 1 shows a perspective view of the truck bed extender.

As can best be seen in FIG. 1, a typical truck for which this would be used has a truck bed having a left side panel 27 and a right side panel 28 which hold a tailgate 26. Within these s the truck bed 29.

Both the left side panel 27 and the right side panel 28 define a side wall chamber 23 which is a small chamber designed to receive a rack which can be mounted on most model trucks.

Between the chamber 23 and very rear of the truck is the back 22 of the side wall.

The present invention is a rack designed to work off of and fit within the side wall chamber 23 so that lumber, ladders or other long equipment may be carried on a tailgate which is not long enough to accommodate the load in the truck bed 29.

The load is elevated to the height of the top 35 of the tailgate 26. In this way, the load is supported by the truck bed 29, the top 35 of the tailgate 26 and by the contact wall 55 of the top cross bar 3.

A left frame 1 and right frame 2 support the top and bottom cross bars 3 and 4. FIG. 2 shows a detailed view of the right frame 2 showing a slanting arm 16 connecting a low parallel arm 21 to a high parallel arm 31. The low parallel arm 21 and high parallel arm 31 are also attached to the main support 17 on their other end. The top cross bar 3, which acts as a transom for supporting the load, is above a bottom cross bar 4 which helps to maintain the spacing. The top cross bar 3 is supported on either side by the high parallel arms 31 and the bottom cross bar 4 is supported on either end to the slanting arm 16.

In the preferred embodiment there is a left frame member 1 and right frame member 2 a top cross bar 3 and a bottom cross bar 4 which together form the entire rack. The separation of these parts, described in more detail below, allows the rack to be easily assembled and to be broken down so that it may be easily stored and transported.

FIG. 3 shows how the main support 17 defines high square pegs 12 and low square pegs 15 to releasably receive the top cross bar 3 and bottom cross bar 4 respectively. Holes 12 and 14 in the pegs 12 and 15 serve to receive pins which pins also pass through the overlapping portion of the top and bottom cross bars 3 and 4 to secure the frames in place.

FIGS. 4 and 5 and 10 and 11 along with alternative embodiments 6a and 6b show how similar pegs 12a and 15a in the slanting arm 16 receive openings 9 in the top and bottom cross bars 3 and 4. Pins may go through the openings 8 in the cross bar for this purpose. In this way, by disassembling the pegs from the bars, the entire unit may be folded in a small area, preferably the size of a tool box, for storage and shipping.

As can best be seen by reference to FIG. 2, the frame is comprised of a main support 17 which has an insertion end 25 and which may have a pad 32. The pad 32 is the same shape and approximately the same diameter as the side wall chamber 23 in the top 22 of the right side wall 28 so that when the insertion end 25 is inserted into the side wall chamber 23 there is a tight fit. At the bottom of the insertion end 25 is a bottom bolt 18 which may have bolt padding 19 which fits into a reduced diameter opening 24 at the bottom of the side wall chamber 23. These openings can be better seen in the cut away view shown in FIG. 14.

The low parallel arm 21 may have a pad 20 to cushion the interface with the top of the side panels 27 and 28.

The device may be sold with differing size pads 32 and 19 so that the diameters of the different pads 32 and 19 correspond to different diameter openings 23 and 24 in different trucks. As is described in more detail below, the length of the cross bars 3 and 4 may also be adjustable to the same purpose.

As can be seen by reference to FIG. 4, the cross bars 3 in the preferred embodiment pivot around pivot 5 connecting brace 34 to pivoting section 6. When raised, pivoting section 6 is held in place against the top 33 of brace 34 as shown in FIG. 4. However, the cross bar 3 may be folded at the pivot point 5 so that the bottom of section 6 is folded against the bottom of section 30 of the cross bar. This is shown in FIG. 7.

In order to further secure the position of the main support 17 within the side wall chamber 23 there is a bottom bolt 18 which may also have padding 19 which serves to secure the position of the frame member. The left frame and the right frame are identical in structure except that square pegs 12 and 15 are on opposite sides so that they may fit within the opening 9 in the top and bottom cross bars 3 and 4 respectively.

Attached near the top of the main support 17 is a high parallel arm 31 and at the bottom is a low parallel arm 21. Since a portion of the low parallel arm 21 fits over the back 22 of the side wall there is a pad 20 to cushion the low parallel arm. The low parallel arm 21 is shorter than the high parallel arm 31 and a slanting arm 16 connects the two. On the left frame member there are top pegs 12 and bottom pegs 15 which face a top peg 12 and a bottom peg 15 on the right frame member too.

A side view of these pegs as shown in FIG. 3 shows that square pegs securing pinholes 13 and 14 are present in the high peg 12 and low peg 15 respectively. The cross bars 2 and 3 also have securing pinholes 7 and 8. A pin may be put through holes 7 and 13 or 8 and 13 or 7 and 14 or 8 and 14 in order to secure the cross bars to the pegs.

As can best be seen by reference to FIG. 4, the cross bars, may be identical. The cross bars comprise a non-pivoting arm 30 which has welded to it receiving brace 34. The top 33 of the receiving brace 34 contacts the top 35 of the pivoting arm 6 when pivoting arm 6 is pivoted to be fully extended. This prevents the pivoting arm 6 from pivoting past the fully extended position but the design allows for the cross bar to be folded for easy storage. When extended the cross bar openings 9 may be fitted into the pegs 12 or 15 on either frame member 1 and 2 in order to join the unit together.

In this way the rack to hold elongated objects on a truck is easily assembled and prepared.

FIG. 5 shows a cross section showing the opening 8 for a pin to secure the cross brace, cross bar or transom 3 to the extension 12.

FIG. 6b shows an alternative embodiment. In this alternative, the cross bar 3 is extendable in length. To extend the length, a pin is inserted in the first leg open 40 in the first leg 42 and through second leg opening 41 in the second leg 43. In this way, the device can be used on trucks of varying lengths. It should be noted that this type of extension mechanism can be utilized on the cross bar 3 shown in FIG. 4 also.

FIG. 7 shows the assembled truck bed extender outside of the truck. In this embodiment, the top and bottom cross bars 3 and 4 are assembled from interlocking blocks 57. In this way, the length of one of the interlocking blocks or the removal of one the interlocking blocks can change the length of the extender between the left and right sets of top and bottom parallel arms.

It is to be noted that the length of the high and low parallel arms 21 and 31 may also be adjustable so that the length of the device from the rear of the vehicle may also be adjusted utilizing the same types of adjustments as described above. One of the key elements which are sought to be utilized by the design is to provide a support from the bottom of the truck bed 29 to the top of the tail gate 26 to the supporting face of the top cross bar 3.

Figure 14:
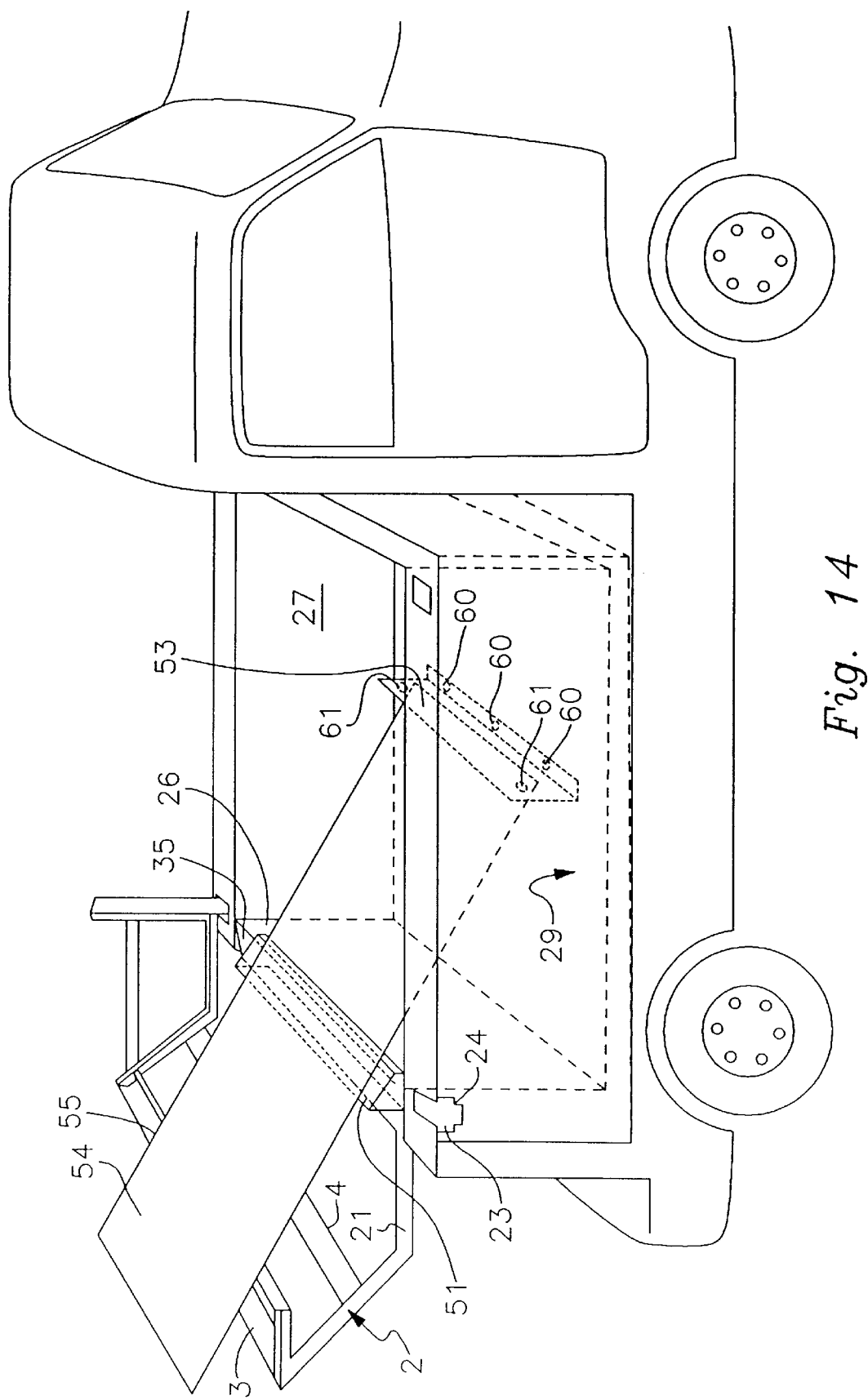
FIG. 14 shows is a cut-a-way view of the supporting faces of an alternative design of the truck bed extender shown in FIG. 1.

As can be seen by reference to FIG. 14 the support may be described as a truck bed extender for holding a load 54 having a bottom, a top and a middle between the bottom and top comprising a three point support means for holding the bottom of the load and middle of the load at two separate distances away from the bottom of the load for use with a truck having a tailgate having a top at the highest point of the tailgate wherein the three point support means comprises:

a) a low support located at the truck bed for holding the load at the truck bed and wherein the low support comprises a plate 53 secured by bolts 60 to the truck bed 29 and wherein the plate comprises at least one tie means for securing the load relative to the plate and wherein the tie means further comprises at least one pair of openings 61 defined on either side of the plate 53 for receiving a cord which cord may pass over the load to secure the load in place;

b) a high support comprised of the top cross bar 3 having a contact face 55 which slants to receive the slanting load 54 which also defines openings 61a to receive a cord passing over the load and wherein the face 55 slants at an angle so that a plane drawn from the low support to the middle support is approximately parallel to and above the contact face 55;

c) a middle support located at the top of the tailgate for supporting the load at or above the height of the tailgate. While this middle support may be the top 35 of the tailgate 26, the support may be enhanced (by increasing the surface area and protecting the top 35 of the tailgate) with a slanting ramp 51 on a tailgate extension 50 which fits over the top 35 of the tailgate 26. FIG. 9 shows a detailed side view of this extension 50. It can be seen that the extension 50 has securing walls 52 on either side of the tailgate 26 a pad 56 cushions the tailgate 26. The slanting ramp 51 is at an angle so that a plane drawn from the low support plate 53 to the high support top cross bar 3 is approximately parallel to and above the ramp 51. In one alternative embodiment, the arm between the two extensions is comprised of a telescoping arm comprising at least one arm within at lease one second arm so that the length may be adjusted in order to accommodate different width vehicles.

In the embodiment shown in FIG. 6b this is comprised of at least two interconnected telescoping arms comprised of an outside arm 30 and an inside arm 6. While these are square in this figure, it is obvious that these may be of any shape with the increased number of sides being relevant for keeping the alignment between the receiving openings on either end. One or more openings 40 in the receiving arm may receive a pin or other fixing means (such as a screw) which would be insertable into the holes 40(a) in the telescoping inside arm 6.

The pegs 12 and 15 may be of different diameters to ensure proper placement of the cross bars 3. The number of cross bars 3 may also be increased or decreased to only one. The peg on the left side and the peg on the right side may be of different size where the alignment of the cross bar 3 was specially desired.

As shown in FIG. 1, the distance between the side wall chamber 23 (also known as a stake pocket) and the rearward support 3 is between 24 inches and 72 inches. The angle allows for the method of 1) Supporting the front of the load on the bed;
2) supporting the middle of the load on the top of the tailgate; and
3) supporting the rear of the load on the rearward support.

Because many varying and different embodiments may be made within the scope of the inventive concept herein taught and because many modifications may be made in the embodiment(s) herein detailed in accordance with the descriptive requirements of the law, it is to be understood that the details herein are to be interpreted as illustrative and not in a limiting sense.

What is claimed is:

1. A method of supporting a load on a vehicle having a tailgate with a top and with a raised and lowered position and wherein the load has a front and middle and a rear and wherein the vehicle has, in addition to the tailgate, a bed, a front and a rear and wherein said vehicle has a rearward support past the tailgate of the vehicle and where the tailgate is closer to the rear of the vehicle than the front of the vehicle comprising the steps of:

1) supporting the front of the load on the bed;
2) supporting the middle of the load on the top of the tailgate in the raised position; and
3) supporting the rear of the load on the rearward support.

2. The method of claim 1 wherein the step of supporting the rear further comprises supporting the rear above the level of the top of the tailgate.

3. The method of claim 1 wherein the step of supporting the middle further comprises supporting the middle on a brace on top of the raised tailgate.

4. The method of claim 3 wherein the step of supporting further comprises cushioning the load.

5. The method of claim 3 wherein the brace further comprises a face slanting at an angle so that a plane drawn from a low support to a high support is approximately parallel to and above the face.

6. The method of claim 3 wherein the tailgate is supportable on either side by a side panel and the brace comprises a middle support supported above the top of the tailgate supported on either side by the side panel.

7. The method of claim 1 further comprising the step of securing the load to the rearward support.

8. The method of claim 1 where the truck bed has a front wall and wherein the step of supporting the front of the load further comprises supporting the front at the intersection of the truck bed and the front wall of the truck bed.

9. The method of claim 1 wherein the truck bed has a front wall and wherein the step of supporting the front of the load comprises the step of supporting the front of the load against the front wall below the level of the tailgate.

10. The method of claim 1 wherein the vehicles has at least one stake pocket and the step of supporting the rear of the load comprises the step of supporting the load from at least one support mounted in the at least one stake pocket.

11. A truck bed extender for a vehicle having a front, a rear, a left and a right sidewall and wherein said left sidewall has a left stake pocket and wherein said right sidewall has a right stake pocket comprising:

(A) a first base mounted in the left stake pocket and extending upward to a desired height;

(B) a second base mounted to the right stake pocket and extending upward therefrom to a desired height;

(C) a first framework mounted to said first base and extending rearward away from the left sidewall;

(D) a second framework mounted to said second base and extending rearward away from the right sidewall; and (E) a transom extending from the first framework to the second framework rearward from the rear, and wherein the truck bed extender further comprises a low support located at the truck bed for holding the load at the truck bed.

12. The truck bed extender of claim 11 wherein the transom has an adjustable length.

13. The truck bed extender of claim 11 wherein the transom is padded.

14. The truck bed extender of claim 11 wherein the desired height of the first base and second base is between six inches and 74 inches above said left sidewall and between six inches and 74 inches above said right sidewall respectively and wherein the transom is supported by the first and second framework at approximately the desired height of the first and second base.

15. The truck bed extender of claim 11 wherein the stake pockets are padded.

16. The truck bed extender of claim 11 wherein the first base contacts the left sidewall at a point and wherein the point contacted is padded and wherein the second base contacts the right sidewall at a point and the point is padded.

* * * * *